United States Patent
Jones et al.

(10) Patent No.: US 10,093,333 B2
(45) Date of Patent: Oct. 9, 2018

(54) SHOPPING CART WITH RFID AND BIOMETRIC COMPONENTS AND ASSOCIATED SYSTEMS AND METHODS

(71) Applicant: Walmart Apollo, LLC, Bentonville, AR (US)

(72) Inventors: Nicholaus Adam Jones, Fayetteville, AR (US); Aaron Vasgaard, Fayetteville, AR (US); Matthew Allen Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/879,589

(22) Filed: Jan. 25, 2018

(65) Prior Publication Data
US 2018/0237048 A1     Aug. 23, 2018

Related U.S. Application Data

(60) Provisional application No. 62/462,644, filed on Feb. 23, 2017.

(51) Int. Cl.
*B62B 3/00* (2006.01)
*G06K 7/00* (2006.01)
(Continued)

(52) U.S. Cl.
CPC .......... *B62B 3/1424* (2013.01); *B62B 5/0096* (2013.01); *G06K 7/10475* (2013.01);
(Continued)

(58) Field of Classification Search
CPC .......... B62B 3/1424; B62B 5/0096; G06K 7/10475; G06K 9/00006; G06K 9/00892; G06Q 30/0609
See application file for complete search history.

(56) References Cited

U.S. PATENT DOCUMENTS

| | | | |
|---|---|---|---|
| 7,494,076 B1 * | 2/2009 | Larson | B30B 9/3007 100/100 |
| 2004/0143505 A1 * | 7/2004 | Kovach | G06Q 10/087 705/23 |

(Continued)

FOREIGN PATENT DOCUMENTS

| | | |
|---|---|---|
| CN | 104332005 A | 2/2015 |
| CN | 104332007 A | 2/2015 |

(Continued)

*Primary Examiner* — Thomas Alunkal
(74) *Attorney, Agent, or Firm* — McCarter & English, LLP; David R. Burns

(57) ABSTRACT

Described in detail herein are systems and methods for interacting with an interactive display using a shopping cart. A biometric device integrated with the handle portion on a shopping cart can detect and discriminate between user attributes. At least one RFID tags can store the captured biometric information associated with the user attributes. A RFID reader and a computing system can be disposed within a predetermined distance of the shopping cart. The RFID reader can communicate with the at least one RFID tag in response to the at least one RFID tag being with a range of the at least one RFID reader to transfer the biometric information stored in the RFID tag to the RFID reader. The RFID reader can transmit the biometric information to the computing system. The computing system can authenticate the user based on the biometric information received via the at least one RFID reader.

20 Claims, 6 Drawing Sheets

(51) Int. Cl.
*B62B 3/14* (2006.01)
*G06K 7/10* (2006.01)
*B62B 5/00* (2006.01)
*G06K 9/00* (2006.01)
*G06Q 30/06* (2012.01)

(52) U.S. Cl.
CPC ..... *G06K 9/00006* (2013.01); *G06K 9/00892* (2013.01); *G06Q 30/0609* (2013.01)

(56) References Cited

U.S. PATENT DOCUMENTS

| | | | | |
|---|---|---|---|---|
| 2006/0293968 | A1* | 12/2006 | Brice | B62B 3/1424 705/14.63 |
| 2007/0008068 | A1* | 1/2007 | Brice | B62B 3/1424 340/5.91 |
| 2008/0249865 | A1* | 10/2008 | Angell | G06Q 30/02 705/14.34 |
| 2008/0249867 | A1* | 10/2008 | Angell | G06Q 30/02 705/14.26 |
| 2008/0249870 | A1* | 10/2008 | Angell | G06Q 30/02 705/14.53 |
| 2008/0316045 | A1* | 12/2008 | Sriharto | G06Q 50/22 340/10.1 |
| 2016/0185375 | A1* | 6/2016 | Yu | B62B 3/146 224/411 |

FOREIGN PATENT DOCUMENTS

| | | |
|---|---|---|
| CN | 104442972 A | 3/2015 |
| CN | 204331927 U | 5/2015 |
| CN | 204480408 U | 7/2015 |
| CN | 204617312 U | 9/2015 |
| KR | 20070111740 A | 11/2007 |

\* cited by examiner

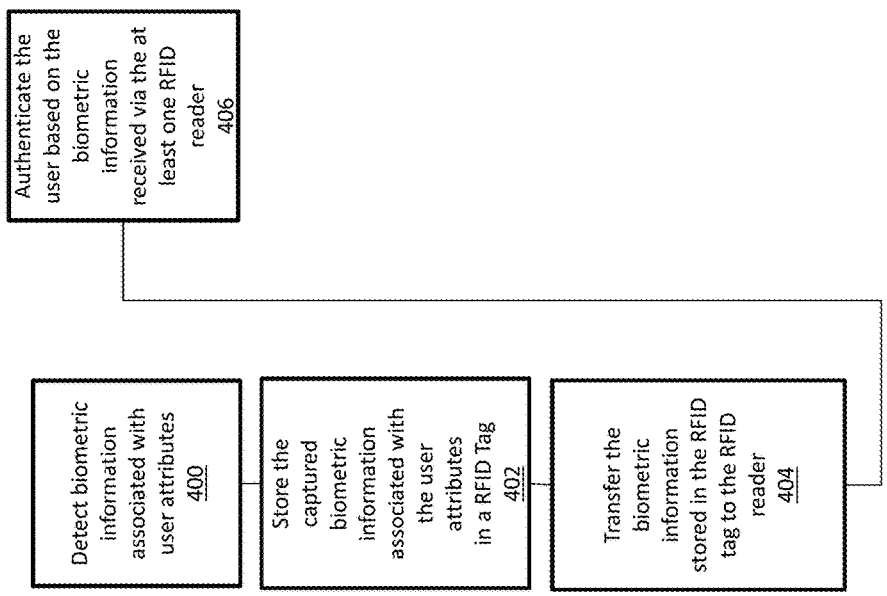

US 10,093,333 B2

SHOPPING CART WITH RFID AND BIOMETRIC COMPONENTS AND ASSOCIATED SYSTEMS AND METHODS

CROSS-REFERENCE TO RELATED PATENT APPLICATIONS

This application claims priority to U.S. Provisional Application No. 62/462,644 filed on Feb. 23, 2017, the content of which is hereby incorporated by reference in its entirety

BACKGROUND

Providing biometric information to authenticate a user can provide for a secure system.

BRIEF DESCRIPTION OF DRAWINGS

Illustrative embodiments are shown by way of example in the accompanying drawings and should not be considered as a limitation of the present disclosure:

FIG. 4 is a flowchart illustrating shopping cart authentication according to exemplary embodiments of the present disclosure.

DETAILED DESCRIPTION

Figure 1A:
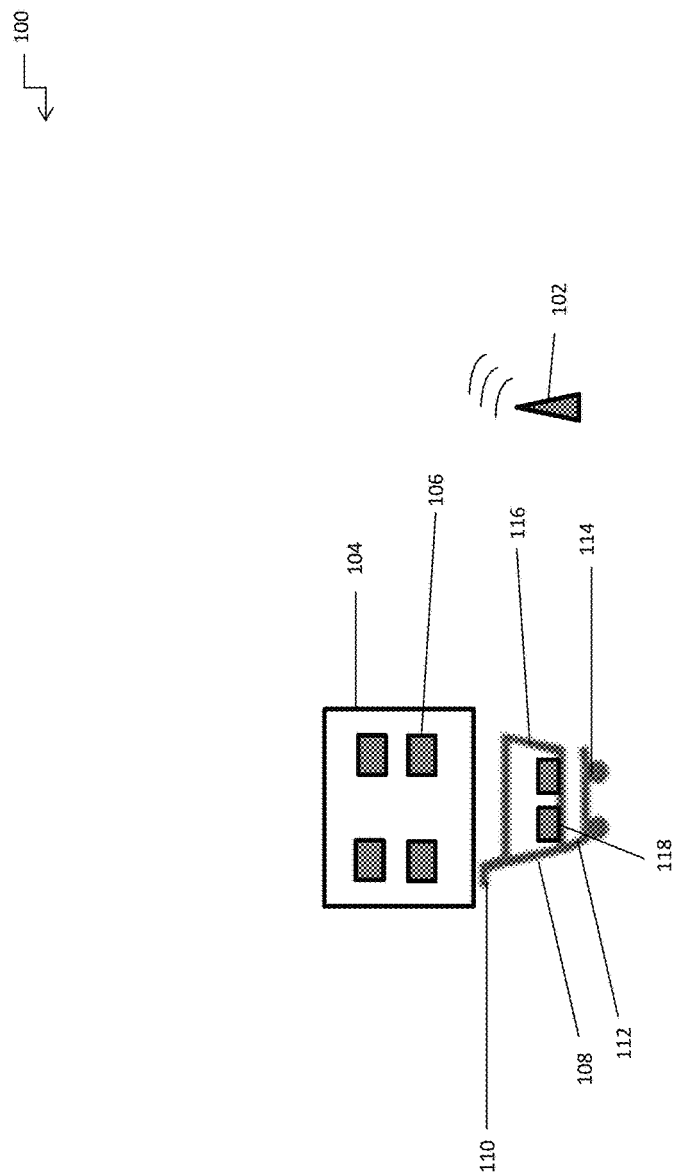
FIG. 1A is a diagram of a shopping cart and an interactive display in a facility according to the present disclosure.

Described in detail herein are systems and methods for using a shopping cart to interact with an interactive display disposed remotely from the shopping cart. A biometric device integrated with the handle portion on a shopping cart can detect and discriminate between user attributes. The shopping cart can include one or more RFID tags. At least one of the RFID tags can store the captured biometric information associated with the user attributes. A RFID reader and the interactive display can be in communication with a computing system such that when the shopping cart is disposed within a specified distance of the RFID reader, the RFID reader can communicate with the at least one RFID tag included on the handle portion of the shopping cart to transfer the biometric information stored in the RFID tag to the RFID reader. The RFID reader can transmit the biometric information to the computing system. The computing system can authenticate the user based on the biometric information received via the at least one RFID reader.

In exemplary embodiments, a shopping cart system includes a shopping cart including a frame having a handle portion, a basket supported by the frame, and casters configured to support the frame. The system further includes one or more biometric devices integrated with the handle portion to detect and discriminate between user attributes. One or more RFID tags can be integrated in the shopping cart. The one or more RFID tags can be configured to store biometric information associated with the user attributes. In response to the one or more RFID tags being within range of the at least one RFID readers, the least one RFID reader can communicate with the one or more RFID tags to transfer the biometric information stored in the one or more RFID tags to at least one RFID reader. The system further includes a computing system operatively coupled to the at least one RFID reader. The computing system can be configured to authenticate the user based on the biometric information received via the at least one RFID reader. The computing system can be programmed to trigger an action on an interactive display of the computing system in response to authentication of the user.

The system further includes RFID tags integrated in the shopping cart, e.g., an a handle portion of the shopping cart. The RFID tags including the at least one RFID tag, a first RFID tag, and a second RFID tag. The first and second RFID tags can be disposed near a surface of the handle portion and are readable by the at least one RFID reader in response to the first and second RFID tags being within range of the at least one RFID reader. In response to the first RFID tag being covered by one of the digits of the user when the first RFID tag is within range of the at least one RFID reader, the at least one RFID reader is prevented from reading the first RFID tag and the computing system is configured to control an interactive display of the computing system to perform one or more action on the interactive display.

The first RFID tag can include a far-field component and a near-field component, the near-field component and far-field component can be moveable with respect to each other between a first position in which the near-field component and far-field component are spaced away from each other and a second position in which the near-field component and far-field component are mechanically and/or electrically coupled to each other. In response to the near-field component and far-field component being moved to the second position when the first RFID tag is within range of the at least one RFID reader. The at least one RFID reader is configured to read the first RFID tag, and the computing system is configured to control an interactive display of the computing system to perform one or more action on the interactive display. The handle portion can include discrete push buttons associated with the RFID tags.

FIG. 1A is a diagram of a shopping cart 108 and an interactive display 106 disposed remotely from the shopping cart in a facility 100 according to the present disclosure. The shopping cart 108 can be operated in the facility 100 by a user. The shopping cart 108 can include a frame 112 having a handle portion 110, a basket 116 supported by the frame 112 and casters 114 configured to support the frame 112. The basket 116 can be configured to support and store physical objects 118. One or more RFID readers 102 can be disposed throughout the facility. In one example, an RFID reader 102 can be disposed with respect to a computing system 104 that is communicatively coupled to the interactive display 106. The handle portion 110 of the shopping cart 108 can include a biometric device and one or more RFID tags. The biometric device can be configured to capture biometric information associated with the user. The RFID tag can be in communication with the biometric device and can be configured to store the biometric information associated the user operating the cart that is captured by the biometric device. In some embodiments, the biometric information can be a signature generated from one or more biometric properties of the user that is captured by the biometric device. The RFID reader 102 can be configured to communicate with the one or more RFID tags in response to the shopping cart 108 being moved within range of the RFID reader 102.

Figure 1B:
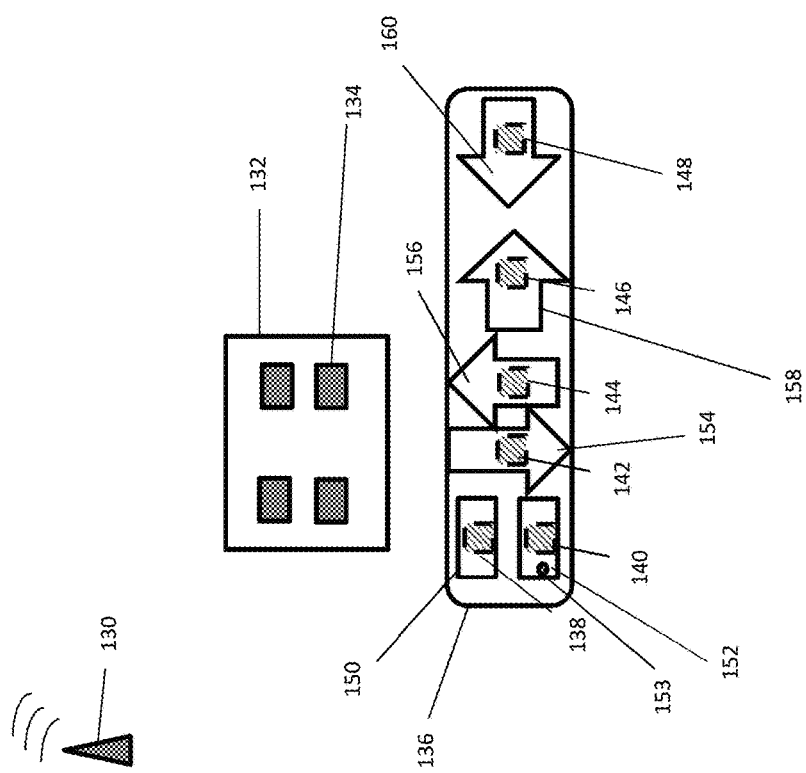
FIG. 1B is an exploded view of the handle portion of the shopping cart according to embodiments of the present disclosure.

FIG. 1B is an exploded view of a handle portion of a shopping cart according to embodiments of the present disclosure. The handle portion 136 of the shopping cart can include one or more RFID tags 138-148 integrated in therein. The RFID tags 138-148 can be passive RFID tags that do not require an internal power source, and are powered with electromagnetic energy transmitted by the RFID reader. A unique identifier can be encoded in each of the RFID tags 138-148. The RFID tags 138-148 can be readable by the RFID reader 130 when in range of the RFID reader 130. The RFID reader 130 can receive the unique identifiers of the RFID tags 138-146. A user can cover one or more of the RFID tags 138-148 using the user's digits or hands to make the one or more of the RFID tags 138-146 unreadable (e.g., to block electromagnetic radiation from the RFID reader and/or to prevent transmission of radiofrequency signal from the covered RFID tag(s). The uncovered RFID tags can receive the electromagnetic radiation of a radiofrequency transmission from the RFID reader(s) and can transmit a radiofrequency signal that includes their respective unique identifiers in response to the electromagnetic radiation from the radiofrequency transmission emitted by the RFID reader(s). The RFID reader 130 forward the received unique identifiers to the computing system 132, which can determine which of the unique identifiers of the one or more RFID tags is received and which are not (i.e. which of the RFID tags were read and which were not). The computing system 132 can control the interactive display 134 of the computing system 132 based on the one or more RFID tags that were not read by the RFID reader(s).

The handle portion 136 of the shopping cart can include one or more RFID tags 138-148 integrated in therein. The RFID tags 138-148 can be passive RFID tags that do not require an internal power source, and are powered with electromagnetic energy transmitted by the RFID reader. A unique identifier can be encoded in each of the RFID tags 138-148. The RFID tags 138-148 can be readable by the RFID reader 130 when in range of the RFID reader 130. The RFID reader 130 can receive the unique identifiers of the RFID tags 138-146. A user can cover one or more of the RFID tags 138-148 using the user's digits or hands to make the one or more of the RFID tags 138-146 unreadable (e.g., to block electromagnetic radiation from the RFID reader and/or to prevent transmission of radiofrequency signal from the covered RFID tag(s). The uncovered RFID tags can receive the electromagnetic radiation of a radiofrequency transmission from the RFID reader(s) and can transmit a radiofrequency signal that includes their respective unique identifiers in response to the electromagnetic radiation from the radiofrequency transmission emitted by the RFID reader(s). The RFID reader 130 forward the received unique identifiers to the computing system 132, which can determine which of the unique identifiers of the one or more RFID tags is received and which are not (i.e. which of the RFID tags were read and which were not). The computing system 132 can control the interactive display 134 of the computing system 132 based on the one or more RFID tags that were not read by the RFID reader(s).

As an example, the computing system 132 can determine the user is attempting to interact with the interactive display 134 in response to the RFID reader 130 not being able to detect and/or read the RFID tag 142, which is covered by the users hand, and being able to detect and/or read RFID tags 138, 140, 144, 146 and 148. The computing system 132 can execute an action correlated to the covered, unread RFID tag 142 on the interactive display 134. The action could be one or more of, scroll, input information and/or make selections on the interactive display. In example embodiments, the RFID tags 138-148 can be passive RFID tags, where the RFID tags 138-148 can use power harvested from RFID reader 130 emissions and/or can be active RFID tags 138-148, where the RFID tags and/or the shopping cart can also optionally include a portable power supply such as a battery to independently power the RFID tags 138-148. Also if desired, the shopping cart can include a recharging circuit (not shown) that serves to recharge such a battery (using, for example, externally-provided electric power and/or harvested RFID reader emissions).

As shown in FIG. 1B, indicia 150-160 representing an action to execute on the interactive display 134 can be disposed on top of each of the RFID tags 138-148. Accordingly, the indicia 150-160 can direct the user to cover up the RFID tag 138-148 disposed below the indicia 150-160 when the user is attempting to execute the action represented by the indicia 150-160 on the interactive display 136. For example, indicia 150 can represent return or delete, indicia 154 can represent the action of scrolling down, indicia 156 can represent scrolling up, indicia 158 can represent scrolling left, indicia 160 can represent scrolling right. The indicia 152 can represent the biometric device. A biometric device 153 can be disposed in the handle. The biometric device 153 can capture biometric information and store the biometric information in the RFID tag 140. The RFID tag 140 can communicate the biometric information to the computing system 132 when in range of the RFID reader 130. The RFID tag 138 can be disposed below indicia 150, the RFID tag 140 can be disposed below indicia 152, the RFID tag 142 can be disposed below indicia 154, the RFID tag 144 can be disposed below indicia 156, the RFID tag 146 can be disposed below indicia 158, and the RFID tag 148 can be disposed below the indicia 160. The user can cover up the respective RFID tags 138-148 to execute the actions as described above.

Figure 1C:
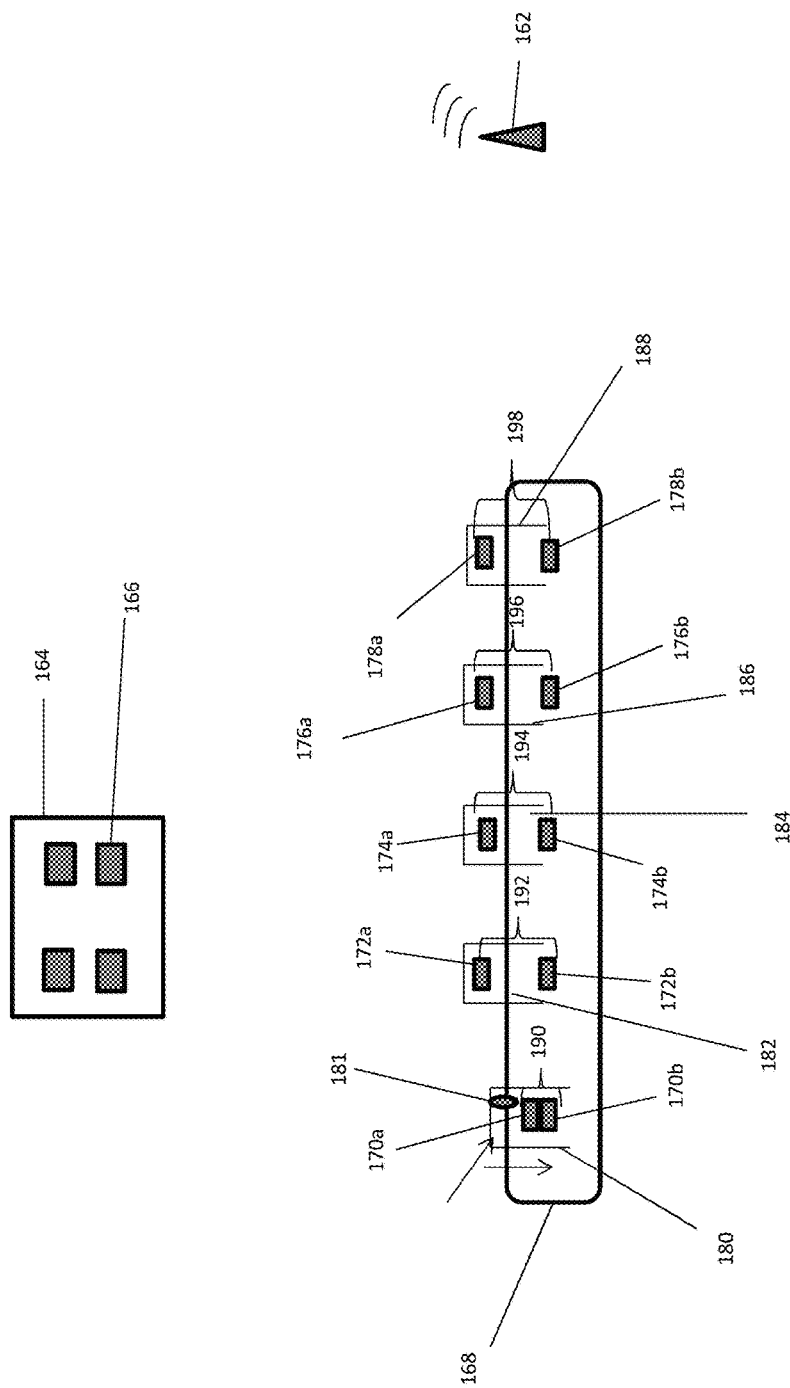
FIG. 1C is an schematic view of a handle portion of a shopping cart according to embodiments of the present disclosure

FIG. 1C is an schematic view of the handle portion of the shopping cart according to embodiments of the present disclosure. In some embodiments, the handle portion 168 can include push buttons. The handle portion 168 of the shopping cart can include one or more RFID tags 150-158. The RFID tags 190-198 can be associated with a unique identifiers. In some embodiments, the RFID tags 190-198 can include a far-field component and a near field component. The operational RFID tags 190-198 can be formed by mechanically and electrically coupling the near-field component and the far-field component. For example, the RFID tag 190 can include a near field component 170a moveably disposed in proximity to the far field component 170b, the RFID tag 192 can include a near field component 172a moveably disposed in proximity to the far field component 172b, the RFID tag 194 can include a near field component 174a moveably disposed in proximity to the far field component 174b, the RFID tag 196 can include a near field component 176a moveably disposed in proximity to the far field component 176b and the RFID tag 198 can include a near field component 178a moveably disposed in proximity to the far field component 178b. Alternatively, the far-field components can be moveably disposed with respect to the near-field components and/or the near-field and far-field components of each RFID tag can be moveably disposed with respect to each other. The near field component and/or far field component are moveable between a first or non-operational position in which the near-field component is spaced away from the far-field component to be mechanically and electrically decoupled from the near-field component and a second or operational position in which the near-field component is mechanically and electrically coupled to the far-field component. The far-field component can include an antenna and the near-field component can include an EPC tag including a unique identifying code (e.g. unique identifiers). The handle portion 168 can include discrete push buttons 180-188 corresponding to the RFID tags 190-198. The push buttons 180-188 may have a momentary or maintained operation. In response to being pressed a push button is moved to a depressed position and is activated. In the momentary arrangement, the push buttons 180-188 remain depressed/activated for only as long as they are pressed. When the momentary push button is released, the push button returns back to its original position and is deactivated. In some embodiments, the push buttons can maintain the depressed/activated position for a time period in response to being pressed before returning to the original deactivated position. In the maintained arrangement, the push buttons 180-188 can remain in the depressed/activated position after being actuated until the push buttons are actuated again, which can return the push buttons to the original deactivated position.

The push buttons 180-188 can be physically biased away from the far-field component and can be physically connected to a near-field RFID tag. Such biasing can be accomplished using any of a variety of spring mechanisms including springs of various shapes, sizes, and materials. In one example, the near-field RFID tag can be placed on at an apex of an interior of a fully-resilient dome and the far-field component can be placed near a base of dome in alignment with the apex. By pushing on the dome, the near-field RFID tag is physically urged towards (and into contact with) the far-field component. Upon removing user pressure from the dome, the apex of the dome (and hence the corresponding near-field RFID tag) can return to the original position. When coupled as described above, a given near-field RFID tag can then communicate with a more distantly-located RFID reader. This communication can include transmitting, for example, information stored in the near-field RFID tag. By one approach, this information can be as limited and as simple as the unique identifier for the transmitting near-field RFID tag. The far-field component can be a far-field antenna which is tuned to a specified frequency.

For example, each of the push buttons 180-188 can be associated with an RFID tag 190-198. A near-field component or far field component of the RFID tag can be disposed at the top of the push button 180-188 and a near-field component or far-field component can be disposed towards the bottom of the push button 180-188. In response to being pressed downward (as indicated by the arrows in FIG. 1B), the near-field or far-field component of the RFID tag disposed at the top of the push button 180-188 can mechanically and electrically couple with near-field or far-field component of the RFID tag disposed toward the bottom of the push button 180-188. In response to the near-field component and far-field component mechanically and electrically coupling, the RFID tag can be read by the RFID reader 162. The RFID tags 190-198 can be passive tags. Passive RFID tags are tags that do not require an internal power source, and are powered with an electromagnetic energy transmitted by the RFID reader 162.

A biometric device 181 can be disposed in the discrete push button 180. The biometric device 181 can capture biometric information and the RFID tag 190 can store the biometric information. The RFID tag 190 can communicate the biometric information to the computing system 164 when the discrete push button 180 is pressed, the near field component 170a and the far field component 170b are mechanically and/or electrically coupled, and the RFID tag 190 is within range of the RFID reader 162.

Figure 2:
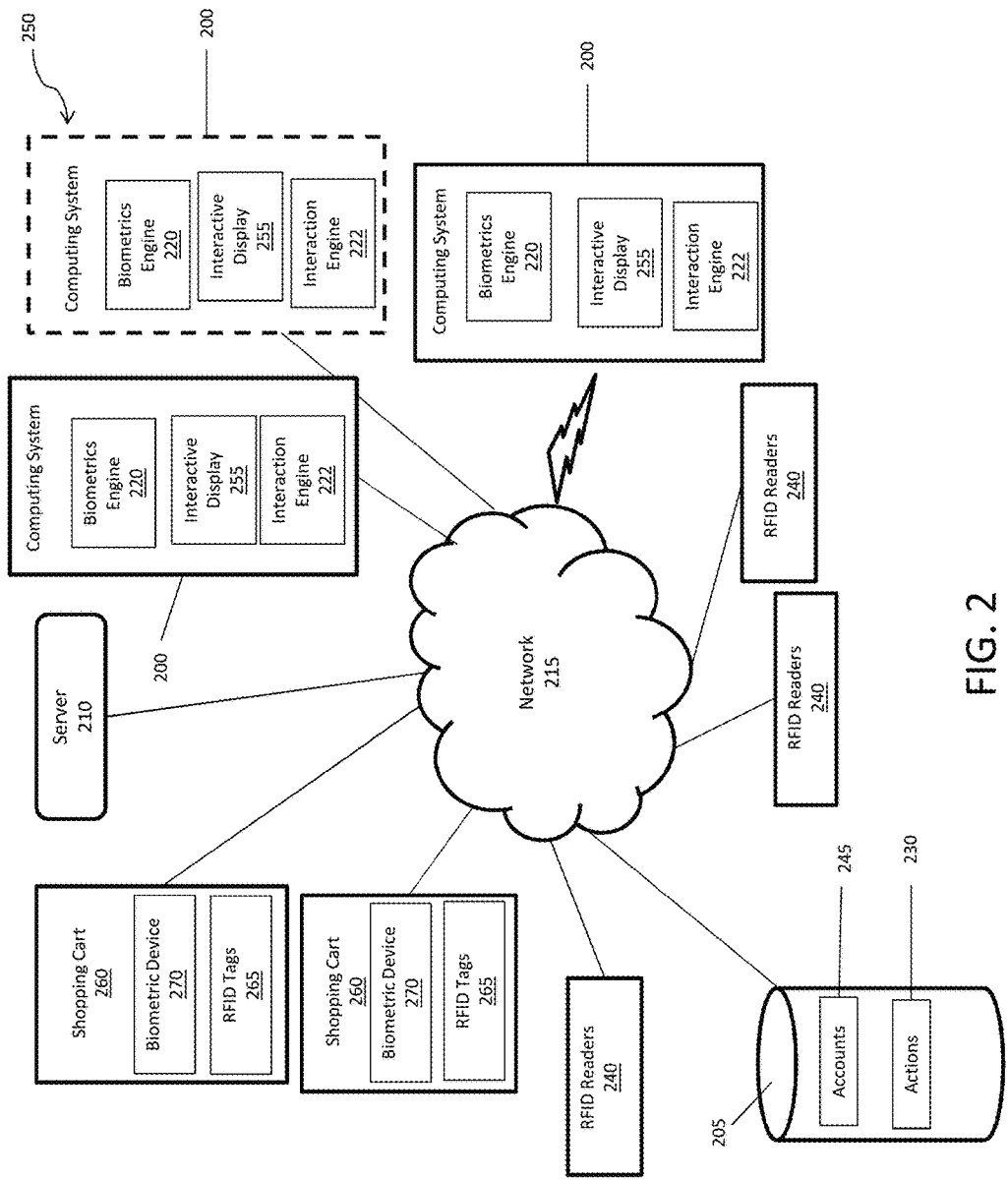
FIG. 2 illustrates an exemplary shopping cart authentication system in accordance with exemplary embodiments of the present disclosure.

FIG. 2 illustrates an exemplary shopping cart authentication system 250 in accordance with exemplary embodiments of the present disclosure. The shopping cart authentication system 250 can include one or more databases 205, one or more servers 210, one or more computing systems 200, one or more shopping carts 260 and RFID readers 240. The shopping carts 260 can include RFID tags 265 and a biometric device 270. In exemplary embodiments, the computing system 200 is in communication with the databases 205, the server(s) 210, and multiple instances of the RFID readers 240, via a communications network 215. The computing system 200 can implement at least one instance of the biometrics engine 220 and/or the interaction engine 222. The computing system 200 can also include an interactive display 255.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 200 and the databases 205, via the network 215. The server 210 hosts one or more applications configured to interact with one or more components computing system 200 and/or facilitates access to the content of the databases 205. In some embodiments, the server 210 can host the biometric engine 220 and/or the interaction engine 222 or portions thereof. The databases 205 may store information/data, as described herein. For example, the databases 205 can include an actions database 230 and accounts database 245. The actions database 230 can store identifiers associated with RFID tags and the correlated actions associated unique identifiers. The accounts database 245 can store biometric information associated with different user accounts. The databases 205 and server 210 can be located at one or more geographically distributed locations from each other or from the computing system 200. Alternatively, the databases 205 can be included within server 210.

In exemplary embodiments, a user can operate a shopping cart 260 within a facility. The shopping cart 260 can include one or more RFID tags 265 and a biometric device 270. The RFID tags 265 and biometric device 270 can be integrated on the handle portion of the shopping cart 260. RFID readers 240 can be disposed throughout the facility. The RFID readers 240 can be configured to detect the RFID tags 265 when the RFID tags 265 are within a predetermined distance of the RFID readers 240. In some embodiments, the shopping cart can include one or more discrete push buttons and each RFID tag can be associated with a discrete push button on the shopping cart. The RFID tags can include a near field component and a far field component. The RFID readers 240 can detect the RFID tags 265 when the near field component and the far field component are mechanically coupled together. Alternatively, as discussed above, RFID tags 265 and biometric device 270 can be integrated in the handle portion of the shopping cart 260. The RFID tags 265 can be readable by the RFID reader 240 when in range of the RFID reader 240. The RFID reader 240 can receive the unique identifiers of the RFID tags 265. A user can cover one or more of the RFID tags 265 using the user's digits or hands to make the one or more of the RFID tags 265 unreadable (e.g., to block electromagnetic radiation from the RFID reader and/or to prevent transmission of radiofrequency signal from the covered RFID tag(s)). The RFID reader 240 can forward the received unique identifiers to the computing system 200, which can determine which of the unique identifiers of the one or more RFID tags 265 is received and which are not (i.e. which of the RFID tags 265 were read and which were not).

The user can use the RFID tags 265 and the biometric device 270 to communicate and interact with a computing system 200. For example, the user can navigate the shopping cart 260 to the computing system 200. The computing system 200 can include an interactive display 255. A RFID reader 260 can be disposed within a predetermined distance of the computing system 200. The interactive display 255 can prompt the user to provide biometric properties. The user can provide biometric properties via the biometric device 270 on the shopping cart. For example, the biometric device 275 can detect one or more of the following biometric properties: finger prints, facial images, iris prints and/or voice recognition. In response, to providing the biometric properties of the user, the biometric device 270 can store biometric information associated with the biometric properties in the storage of one of the RFID tag 265. In response to the RFID tag 265 being within range of the RFID reader 260, the RFID reader can read the biometric information from the RFID tag 265 and can provide the biometric information to the computing system 200. For example, the biometric device 270 can capture an image or a scan of a biometric property of the user. The biometric device 270 can convert the image or the scan as an encrypted biometric key or mathematical representation based on the characteristics of the image or scan (e.g., a signature). The RFID reader 240 can transmit the encrypted biometric key or mathematical representation to the computing system 200. In other embodiments, the RFID reader 240 can transmit the image or scan to the computing system 200. The user can control the transmission of the biometric information from the RFID tag 265, by either covering the RFID tag 265 or pushing the discrete push button associated with the RFID tag 265.

The computing system 200 can execute the biometric engine 220 in response to receiving the biometric information (the biometric key or the image or scan). In the event the computing system 200 receives the image or scan, the biometrics engine 220 can convert the image or scan into an encrypted biometric key and/or mathematical representation. The biometrics engine 220 can query the accounts database 245 using the biometric information to retrieve an account associated with the biometric information. In response to retrieving an account, the biometrics engine 220 can authenticate the user (e.g., the biometric information received from the RFID tag corresponds to biometric information stored in the database). The biometrics engine 220 can indicate the authentication of the user on the interactive display 255. In response to failing to retrieve an account associated with the biometrics information, the biometrics device can prompt the user to provide the biometrics information again and/or create a new account. In response to failing to retrieve an account associated with the biometrics information for the same user, for more than a predetermined amount of times, the biometrics engine 220 can transmit an alert and/or prevent the user from further interacting and communicating with the computing system 200.

In response to the user being authenticated, the user can interact and communicate with the interactive display 255 and the computing system 220 using the RFID tags on the shopping cart. That is, is embodiments of the present disclosure, the computing system 220 can prevent the user from interacting with the interactive display (e.g., via the other RFID tags on the shopping cart) until the biometric information is authenticated. The user can intend to execute an action on the interactive display 255 of the computing system 200. The action can be, scrolling on the interactive display, inputting information on the interactive display, and/or making selections on the interactive display. Each RFID tag on the shopping cart can be correlated with at least one action. Each RFID tag can also be associated with an identifier. As discussed above, the user can communicate with the computing system 200 controlling transmission of the RFID tags signal by either covering the RFID tag and/or pushing the discrete push button associated with the RFID tag. The RFID reader 240 can detect the identifier associated with the RFID tag 265 which the for which user is attempting to control the transmission of and can transmit the identifier to the computing system 200.

The computing system 200 can execute the interaction engine 222 in response to receiving the identifier. The interaction engine 222 can query the actions database 230 using the identifier to retrieve the action correlated to the covered RFID tag 265. The interaction engine 222 can execute the retrieved action on the interactive display 255 of the computing system 200. In some embodiments, the user can cover more than one RFID tags 265. For example, the user can intend to scroll left and make a selection. The user control the transmission of a signal of a first RFID tag associated with scrolling left and a second RFID tag associated with making a selection. The RFID reader 240 can transmit the first and second identifier associated to the first and second RFID tags, to the computing system 200 in the order in which the user controlled the transmission of the signals. The computing system 200 can execute the interaction engine 222 in response to receiving the first and second unique identifiers. The interaction engine 222 can retrieve a first and second action correlated to the first and second RFID based on the first and second unique identifiers, from the actions database 230. The interaction engine 222 can execute the first and second action (i.e. scroll to the left and make a selection) on the interactive display 255 in the order the computing system 200 received the first and second unique identifiers.

As a non-limiting example, the shopping cart authentication system 250 can be implemented in a retail store. The computing system 200 can be a Point of Sale (POS) terminal with an interactive display 255. The RFID reader 240 can be disposed with respect to the POS terminal. A customer operating a shopping cart in the retail store can navigate the shopping cart carrying products indented for purchase to a self-service POS terminal. A user can interact with the POS terminal by initially accessing a user account. The interactive display 255 can instruct the user to provide biometric information. The customer can provide biometric information using the biometric device 270 on the shopping cart. The biometric device 270 can detect one or more of the following biometric properties: finger prints, facial images, iris prints and/or voice recognition. In response, to providing the biometric information, an RFID tag 265 coupled to the biometric device 270 can store the biometric information received by the biometric device 270. In some embodiments, the shopping cart can include one or more discrete push buttons and each RFID tag can be associated with a discrete push button on the shopping cart. The RFID tags can include a near field component and a far field component. The RFID readers 240 can detect the RFID tags 265 when the near field component and the far field component are mechanically coupled together. Alternatively, as discussed above, RFID tags 265 and biometric device 270 can be integrated in the handle portion of the shopping cart 260. The RFID tags 265 can be readable by the RFID reader 240 when in range of the RFID reader 240. The RFID reader 240 can receive the unique identifiers of the RFID tags 265. A user can cover one or more of the RFID tags 265 using the user's digits or hands to make the one or more of the RFID tags 265 unreadable (e.g., to block electromagnetic radiation from the RFID reader and/or to prevent transmission of radiofrequency signal from the covered RFID tag(s)). The RFID reader 240 can forward the received unique identifiers to the computing system 200, which can determine which of the unique identifiers of the one or more RFID tags 265 is received and which are not (i.e. which of the RFID tags 265 were read and which were not).

The customer can communicate with the POS terminal using the RFID tags 265 and/or the biometric device 270. The POS terminal can execute the biometric engine 220 in response to receiving the biometric information (the biometric key or the image or scan). In the event the POS terminal receives the image or scan, the biometrics engine 220 can convert the image or scan into an encrypted biometric key and/or mathematical representation. The biometrics engine 220 can query the accounts database 245 using the biometric information to retrieve an account associated with biometric. In response to retrieving an account the biometrics engine 220 can authenticate the customer. The biometrics engine 220 can indicate the authentication of the customer on the interactive display 255. In response to failing to retrieve an account associated with the biometrics information the biometrics device can prompt the customer to provide the biometrics information again and/or create a new account. In response to failing to retrieve an account associated with the biometrics information for the same customer, for more than a predetermined amount of times, the biometrics engine 220 can transmit an alert and/or prevent the customer from further interacting and communicating with the computing system 200. As one example, the alert can be transmitted to an associate that assistance may be needed because a user account cannot be found based on the biometrics information and/or because the biometrics information is absent, incomplete, invalid, and the like.

In response to retrieving the customer account of the customer, the interactive display the customer's preferences, account information, preferred payment information and other customer related information on the interactive display 255 of the POS terminal. The customer can scan the products intended for purchase at the POS terminal and the interactive display 255 can display information associated with the products. The customer may wish to interact with the interactive display 255 during the transaction. For example, the interactive display 255 can present an option to remove item from cart, if the customer decides not to purchase one of the products. The option can be presented in the form of an "x" selection item displayed with respect to the name of the product. The customer may be able to select the remove item from cart by scrolling to the "x" selection and selecting the "x" selection. The customer can have the interactive display execute the actions using the RFID tags disposed on the handle of the shopping cart. The customer can execute the actions by controlling the transmission of the signal of the RFID tags 265 disposed on the shopping cart, by either covering the RFID tag or pressing a discrete push button associated with the RFID tag. For example, the customer can control the transmission of the signal of a first and second RFID tag. The RFID reader 240 can detect the first and second unique identifiers of the first and second RFID tags transmits the first and second unique identifiers to the POS terminal. The POS terminal can execute the interaction engine 222 in response to receiving the first and second unique identifiers. The interaction action engine 222 can retrieve the first and second actions correlated with the first and second RFID tag from the actions database 230 based on the first and second unique identifiers. The interaction engine 222 can execute the first and second action in the order in which the computing received the corresponding first and second unique identifiers (i.e. scroll to "x" and selecting "x").

Figure 3:
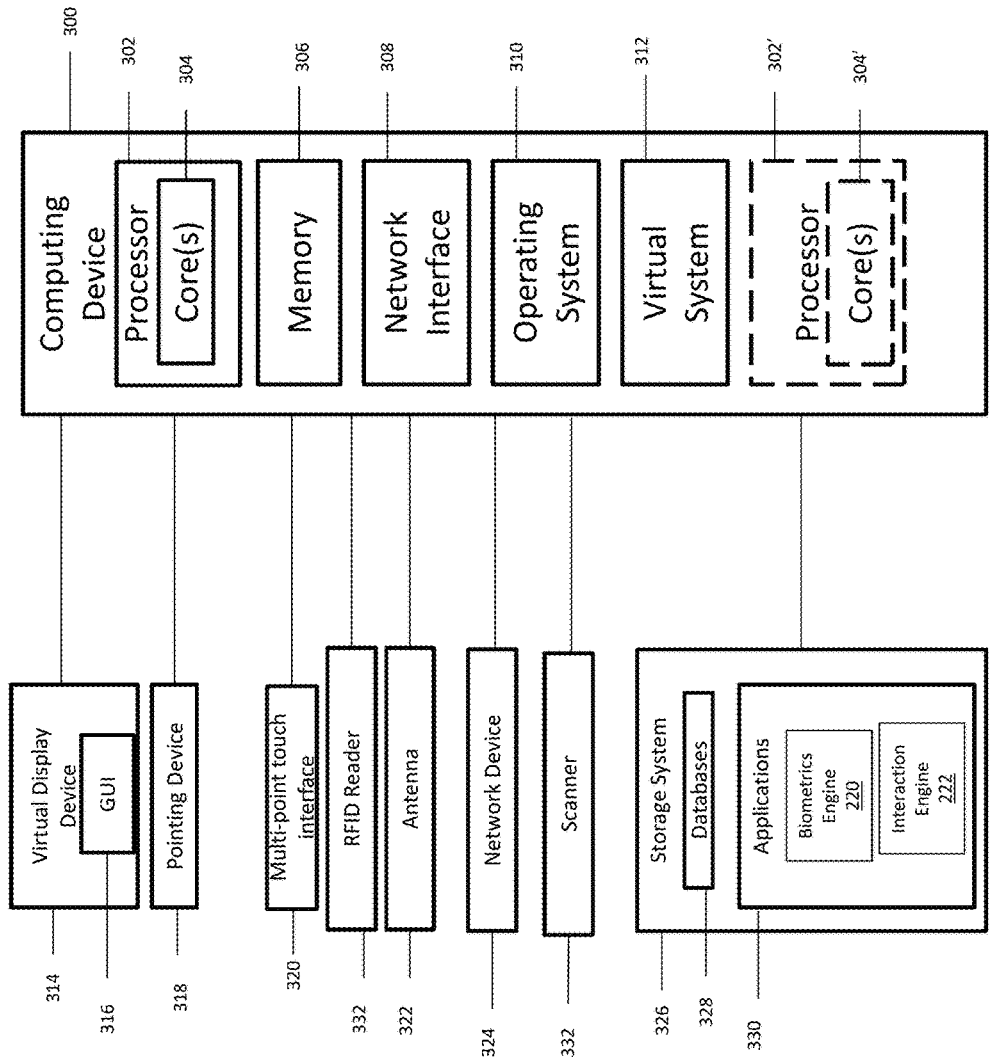
FIG. 3 illustrates an exemplary computing device in accordance with exemplary embodiments of the present disclosure.

FIG. 3 is a block diagram of an example computing device 300 for implementing exemplary embodiments of the present disclosure. Embodiments of the computing device 300 can implement embodiments of the biometrics engine 220 and/or the interaction engine 222. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the biometrics engine 220 and the interaction engine 222) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320 and a pointing device 318. The user can also interact with the visual display device via buttons on the handle portion of a shopping cart using RFID tags integrated with the shopping cart. The RFID tags can communicate with the computing device 300, via a RFID reader 332.

The computing device 300 may also include one or more storage devices 326, such as a hard-drive, CD-ROM, or other computer readable media, for storing data and computer-readable instructions and/or software that implement exemplary embodiments of the present disclosure (e.g., applications 330 e.g. the biometrics engine 220 and interaction engine 222). For example, exemplary storage device 326 can include one or more databases 328 for storing information regarding the accounts and actions correlated to identifiers of RFID tags. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

FIG. 4 is a flowchart illustrating a process implemented by the shopping cart authentication system according to exemplary embodiments of the present disclosure. In operation 400, a biometric device (e.g. biometric device 138, 270 as shown in FIGS. 1B-2) integrated with the handle portion (e.g. handle portion 110, 126 as shown in FIGS. 1A-B) on a shopping cart (e.g. shopping cart 108, 260 as shown in FIG. 1A, 2) can detect and discriminate between user attributes. The shopping cart can include one or more RFID tags (e.g. RFID tags 128-136, 265 as shown in FIGS. 1B-2) integrated on the handle portion of the shopping cart. In operation 402, one of the RFID tags can store the captured biometric information associated with the user attributes. A RFID reader (e.g. RFID reader 102, 120 240, 240 as shown in FIGS. 1A-2) and a computing system (e.g. computing system 104, 122 and 200 as shown in FIGS. 1A-2) can be disposed within a predetermined distance of the shopping cart. In operation 404, the RFID reader can communicate with the at least one RFID tag in response to the at least one RFID tag being within a range of the at least one RFID reader to transfer the biometric information stored in the RFID tag to the RFID reader. The RFID reader can transmit the biometric information to the computing system. In operation 406, the computing system can authenticate the user based on the biometric information received via the at least one RFID reader.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A shopping cart system comprising:
   a shopping cart including a frame having a handle portion, a basket supported by the frame, and a plurality of caster configured to support the frame;
   a biometric device integrated with the handle portion to detect and discriminate between user attributes;
   at least one RFID tag integrated in the shopping cart, the at least one RFID tag is configured to store biometric information associated with the user attributes;
   at least one RFID reader configured to communicate with the at least one RFID tag in response to the at least one RFID tag being with a range of the at least one RFID reader to transfer the biometric information stored in the RFID tag to the RFID reader; and
   a computing system operatively coupled to the at least one RFID reader, the computing system being configured to authenticate the user based on the biometric information received via the at least one RFID reader.

2. The system in claim 1, wherein the computing system is programmed to trigger an action on an interactive display of the computing system in response to authentication of the user.

3. The system in claim 2, wherein the action is based on a type of user attribute that is detected by the biometric device.

4. The system of claim 1, further comprising:
   a plurality of RFID tags integrated in the handle portions, the plurality of RFID tags including the at least one RFID tag, a first RFID tag, and a second RFID tag.

5. The system of claim 4, wherein the first and second RFID tags are disposed near a surface of the handle portion and are readable by the at least one RFID reader in response to the first and second RFID tags being with a range of the at least one RFID reader, and wherein, in response to the first RFID tag being covered by one of the digits of the user when the first RFID tag is within range of the at least one RFID reader, the at least one RFID reader is prevented from reading the first RFID tag and the computing system is configured to control an interactive display of the computing system to perform one or more action on the interactive display.

6. The system in claim 5, wherein the action is one or more of scroll, input information, and make selections on the interactive display.

7. The system in claim 4, wherein the first RFID tag includes far-filed component and a near-field component, the near-field component and far-field component being moveable with respect to each other between a first position in which the near-field component and far-field component are spaced away from each other and a second position in which the near-field component and far-field component are mechanically coupled to each other, and wherein, in response to the near-field component and far-field component being moved to the second position when the first RFID tag is within range of the at least one RFID reader, the at least one RFID reader is reads the first RFID tag and the computing system is configured to control an interactive display of the computing system to perform one or more action on the interactive display.

8. The system in claim 1, wherein the handle portion includes discrete push buttons.

9. The system in claim 1, further comprising a database coupled to the computing system, and the computing system is programmed to query the database to determine the corresponding action to perform in response to authentication.

10. The system in claim 1, wherein the user attributes detected by the biometric device include at least one of finger prints, facial images, iris prints or voice recognition.

11. A method comprising:
detecting and discriminating between user attributes via a biometric device integrated with the handle portion of a shopping cart;
storing, via at least one RFID tag integrated in the shopping cart, biometric information associated with the user attributes;
communicating via at least one RFID reader, with the at least one RFID tag in response to the at least one RFID tag being with a range of the at least one RFID reader to transfer the biometric information stored in the RFID tag to the RFID reader; and
authenticating the user based on the biometric information received via the at least one RFID reader via a computing system operatively coupled to the at least one RFID reader.

12. The method in claim 11, further comprising triggering, via the computing system, an action on an interactive display of the computing system in response to authentication of the user.

13. The method in claim 12, wherein the action is based on a type of user attribute that is detected by the biometric device.

14. The method of claim 11, wherein a plurality of RFID tags are integrated in the handle portions and the plurality of RFID tags include the at least one RFID tag, a first RFID tag, and a second RFID tag.

15. The method of claim 14, further comprising:
preventing the at least one RFID reader from reading the first RFID tag in response to the first RFID tag being covered by one of the digits of the user;
controlling, via the computing system, an interactive display of the computing system to perform one or more action on the interactive display, and
wherein the first and second RFID tags are disposed near a surface of the handle portion and are readable by the at least one RFID reader in response to the first and second RFID tags being with a range of the at least one RFID reader.

16. The method in claim 15, wherein the action is one or more of scroll, input information, and make selections on the interactive display.

17. The method in claim 14, further comprising:
reading, via the at least one RFID reader, the first RFID tag in response to a near-field component and far-field component being moved from a first position to a second position when the first RFID tag is within range of the at least one RFID reader;
controlling, via the computing system, an interactive display of the computing system to perform one or more action on the interactive display, and
wherein the first RFID tag includes far-filed component and the near-field component, the near-field component and far-field component being moveable with respect to each other between the first position in which the near-field component and far-field component are spaced away from each other and the second position in which the near-field component and far-field component are mechanically coupled to each other.

18. The method in claim 11, wherein the handle portion includes discrete push buttons.

19. The method in claim 11, query, via the computing system, a database coupled to the computing system to determine the corresponding action to perform in response to authentication.

20. The method in claim 11, wherein the user attributes detected by the biometric device include at least one of finger prints, facial images, iris prints or voice recognition.

* * * * *